(12) United States Patent
Wu

(10) Patent No.: US 7,383,904 B2
(45) Date of Patent: Jun. 10, 2008

(54) AUXILIARY POWER UNIT STARTING APPARATUS FOR A WHEELCHAIR

(75) Inventor: Donald P. H. Wu, Hsin-feng Hsiang (TW)

(73) Assignee: Pihsiang Machinery Manufacturing Co., Ltd., Hsing-Feng Hsiang, Hsinchu County (TW)

( * ) Notice: Subject to any disclaimer, the term of this patent is extended or adjusted under 35 U.S.C. 154(b) by 471 days.

(21) Appl. No.: 11/226,942

(22) Filed: Sep. 14, 2005

(65) Prior Publication Data
US 2007/0056785 A1    Mar. 15, 2007

(51) Int. Cl.
*B60K 7/00* (2006.01)
(52) U.S. Cl. ...................... 180/65.5; 180/907
(58) Field of Classification Search ............... 180/65.1, 180/65.5, 907, 6.48, 6.5, 206, 220; 318/488
See application file for complete search history.

(56) References Cited

U.S. PATENT DOCUMENTS

| | | | | |
|---|---|---|---|---|
| 5,161,630 A | * | 11/1992 | Garin et al. ................ | 180/65.2 |
| 5,771,988 A | * | 6/1998 | Kikutani et al. ............ | 180/65.5 |
| 5,818,189 A | * | 10/1998 | Uchiyama et al. .......... | 318/488 |
| 5,878,829 A | * | 3/1999 | Kanno et al. ............... | 180/65.5 |
| 6,057,617 A | * | 5/2000 | Schmid ....................... | 310/77 |
| 6,092,615 A | * | 7/2000 | Pusch et al. ................ | 180/65.5 |
| 6,155,367 A | * | 12/2000 | Alber .......................... | 180/65.5 |
| 6,230,831 B1 | * | 5/2001 | Ogata et al. ................ | 180/65.1 |
| 6,302,226 B1 | * | 10/2001 | Kanno et al. ................ | 180/6.5 |
| 6,321,863 B1 | * | 11/2001 | Vanjani ...................... | 180/65.5 |
| 6,354,390 B1 | * | 3/2002 | Uchiyama et al. ......... | 180/65.1 |

* cited by examiner

*Primary Examiner*—Christopher Bottorff
(74) *Attorney, Agent, or Firm*—Charles E. Baxley

(57) ABSTRACT

An auxiliary power unit starting apparatus for a wheelchair comprises a housing, a plurality of triggers fixed in a triggering disc which is installed on an inner surface of the housing, a plurality of return springs biased between the housing and the driving disc for providing an elastic force for enabling the thick portion of the triggers to keep abutting against the deep end of the chutes, a hand wheel fixed to the driving disc, a switch is fixed to the stator for starting and stopping the motor and is to be triggered by the triggering disc. When the user rotates the hand wheel, the triggering disc will trigger the switch, and thus the motor will be started and will produce an auxiliary driving power for rotating the wheel of the wheelchair.

5 Claims, 17 Drawing Sheets

US 7,383,904 B2

AUXILIARY POWER UNIT STARTING APPARATUS FOR A WHEELCHAIR

BACKGROUND OF THE INVENTION

1. Field of the Invention

The present invention relates to an auxiliary power unit starting apparatus for a wheelchair, more particularly to a starting apparatus that can start the motor to produce an auxiliary driving power at the time the user is rotating the hand wheel of the wheelchair.

2. Description of the Prior Art

For a disabled people, conventional wheelchair is more than a means of transportation, it is an optimum rehabilitation tool, because the user has to rotate the wheels by hand, and this can exercise the user's hand and is good for rehabilitation. It is to be noted that running on a flat and smooth road is not a difficult thing for the user. However, the user will probably feel hard if running up a slope, and if the slope angle is greater than 15 degrees, the user can't overcome it independently.

Therefore, a power-assisted wheelchair, such as the device of U.S. Pat. Nos. 6,230,831, 5,818,189, 6,354,390 and 5,878,829, has been made to overcome this problem, wherein an electric motor is disposed in the wheel hubs, and the motor starting device is designed in such a way that the electric motor will be started when the user rotate the hand wheel.

To prevent the motor from being started when the user just touches the hand wheel, the hand wheel is generally designed to have a travel distance, that is, only when the hand wheel rotates a certain distance, the electric motor will then be started. Therefore, the travel distance can't be overly long, otherwise, the response of the electric motor will be too slow.

According to the conventional technology, the start of a power assisted wheelchair is generally controlled by precision-control electronic component or sensor. However, using such electronic precision electronic elements will not only increase the cost but also will increase the failure rate.

The present invention has arisen to mitigate and/or obviate the afore-described disadvantages.

SUMMARY OF THE INVENTION

The primary objective of the present invention is to provide a starting apparatus that can start the motor to produce an auxiliary driving power at the time the user is rotating the hand wheel of the wheelchair. The device of the present invention is compact and simple structured and can be easily manufactured and assembled.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
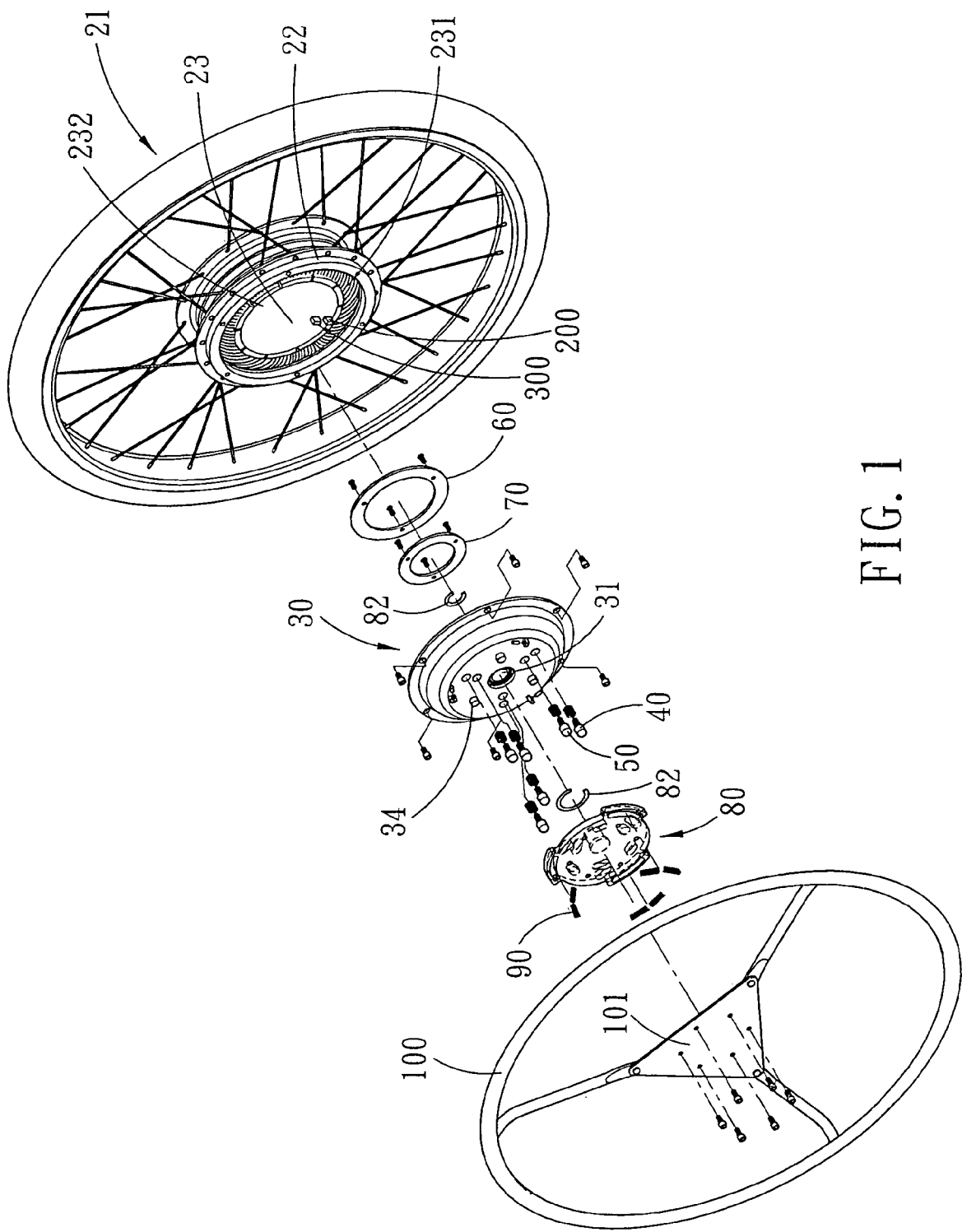
FIG. 1 is an exploded view of showing the principle components in accordance with a first preferred embodiment of the present invention.
Figure 2:
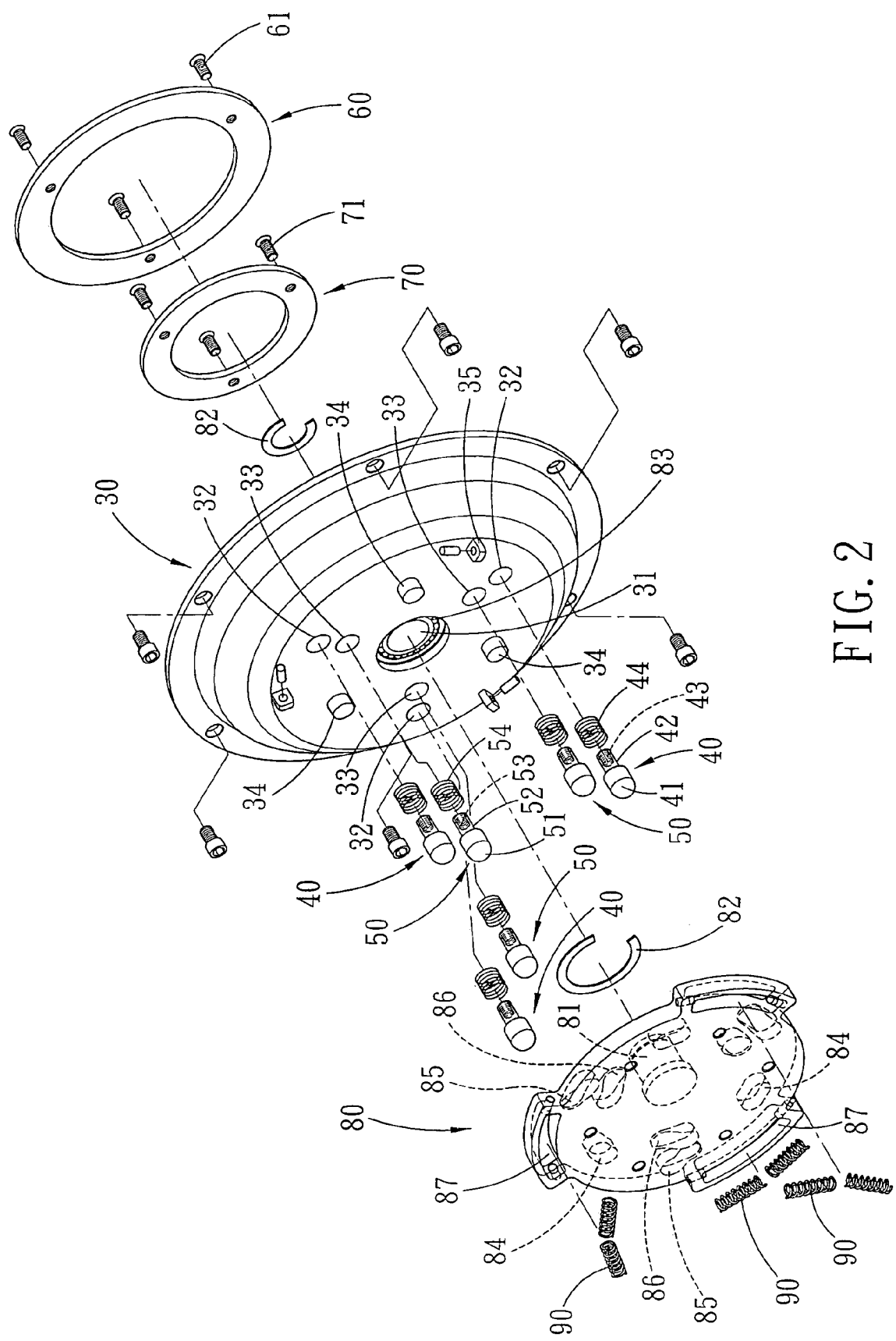
FIG. 2 is an enlarged view of FIG. 1.
Figure 3:
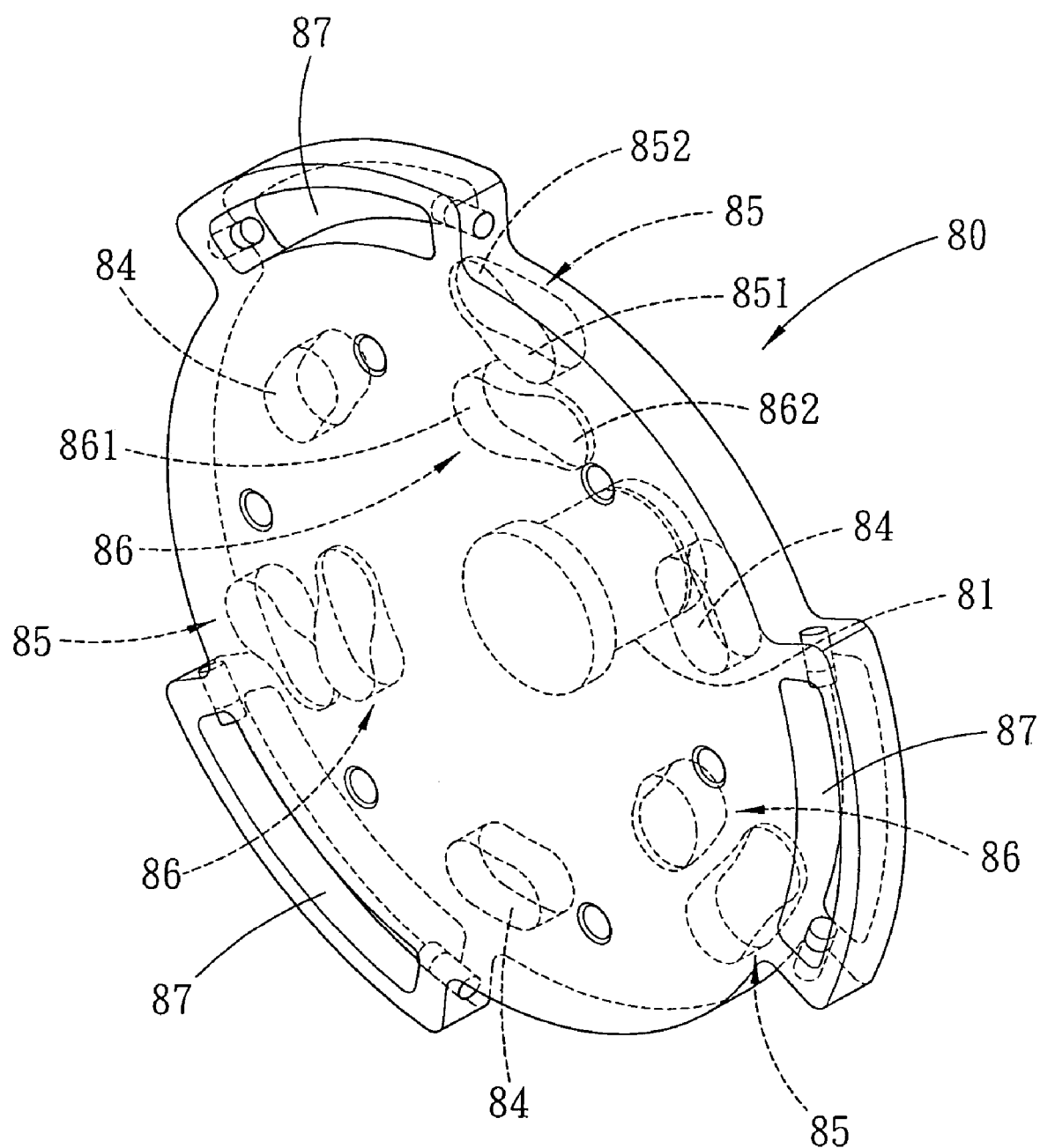
FIG. 3 is an enlarged view of the driving disc of FIG. 1.
Figure 4:
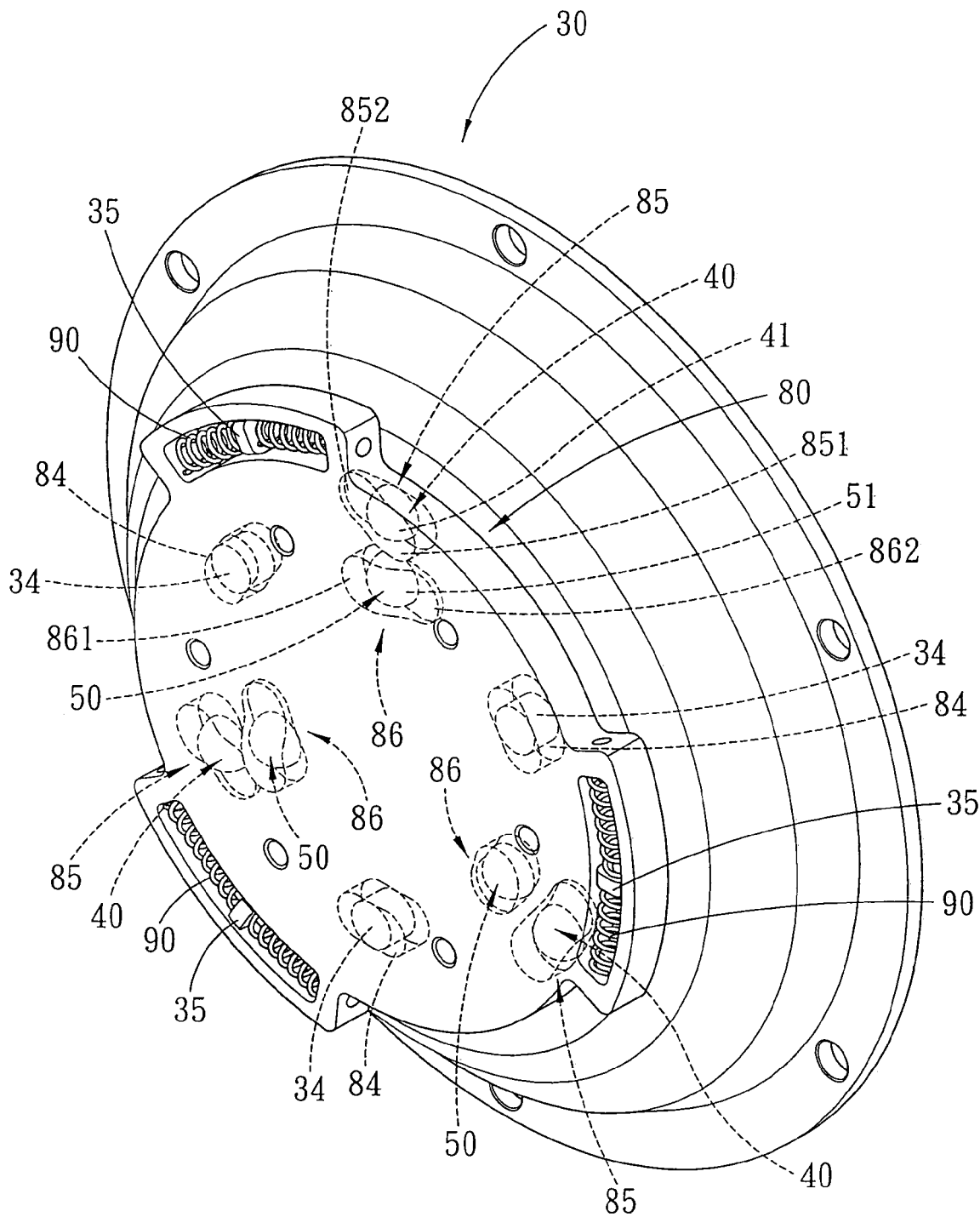
FIG. 4 is an assembly view of the auxiliary power unit starting apparatus of FIG. 2.
Figure 5:
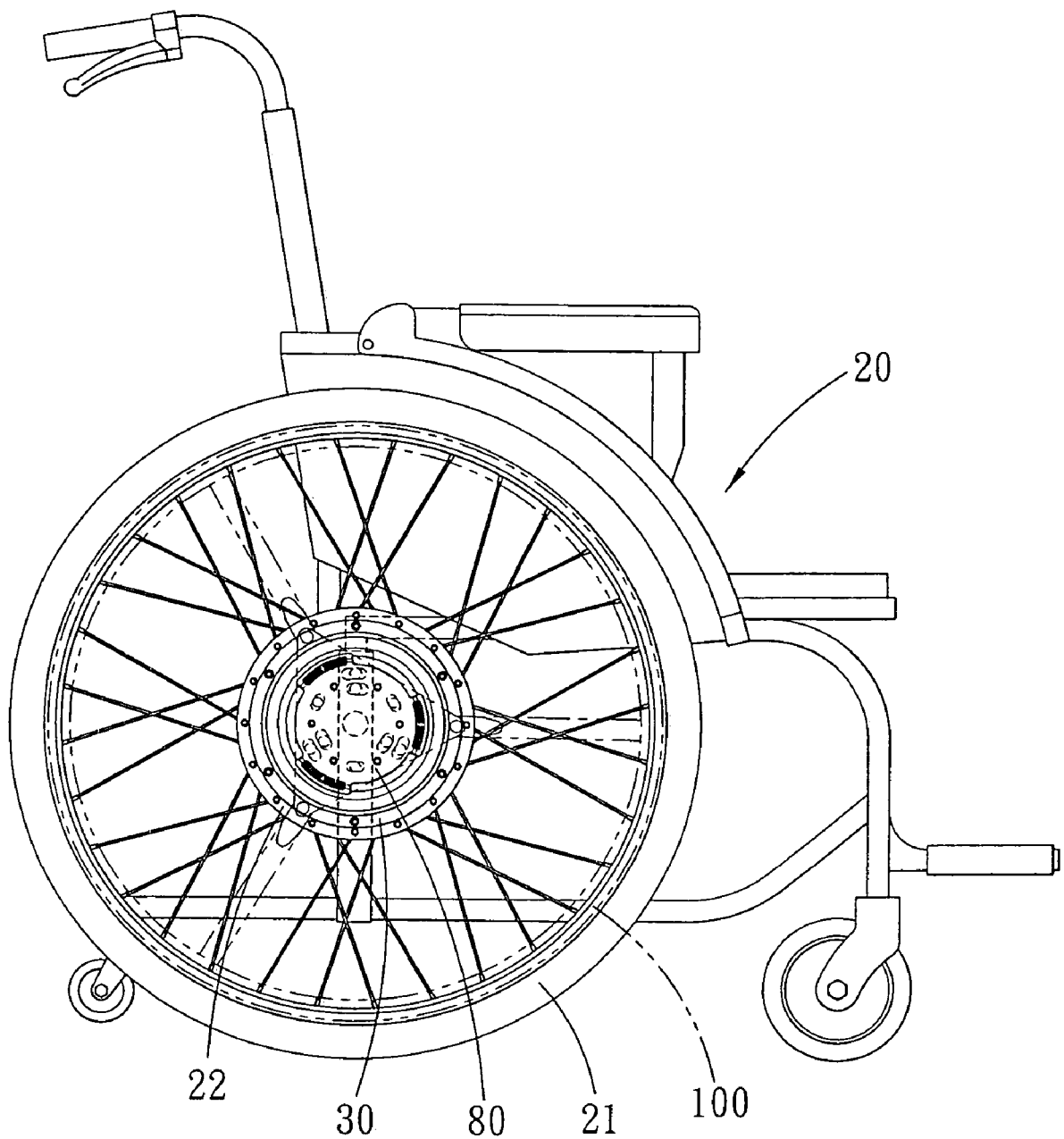
FIG. 5 shows the wheelchair with an auxiliary power unit starting apparatus in accordance with the first embodiment of the present invention.
Figure 6:
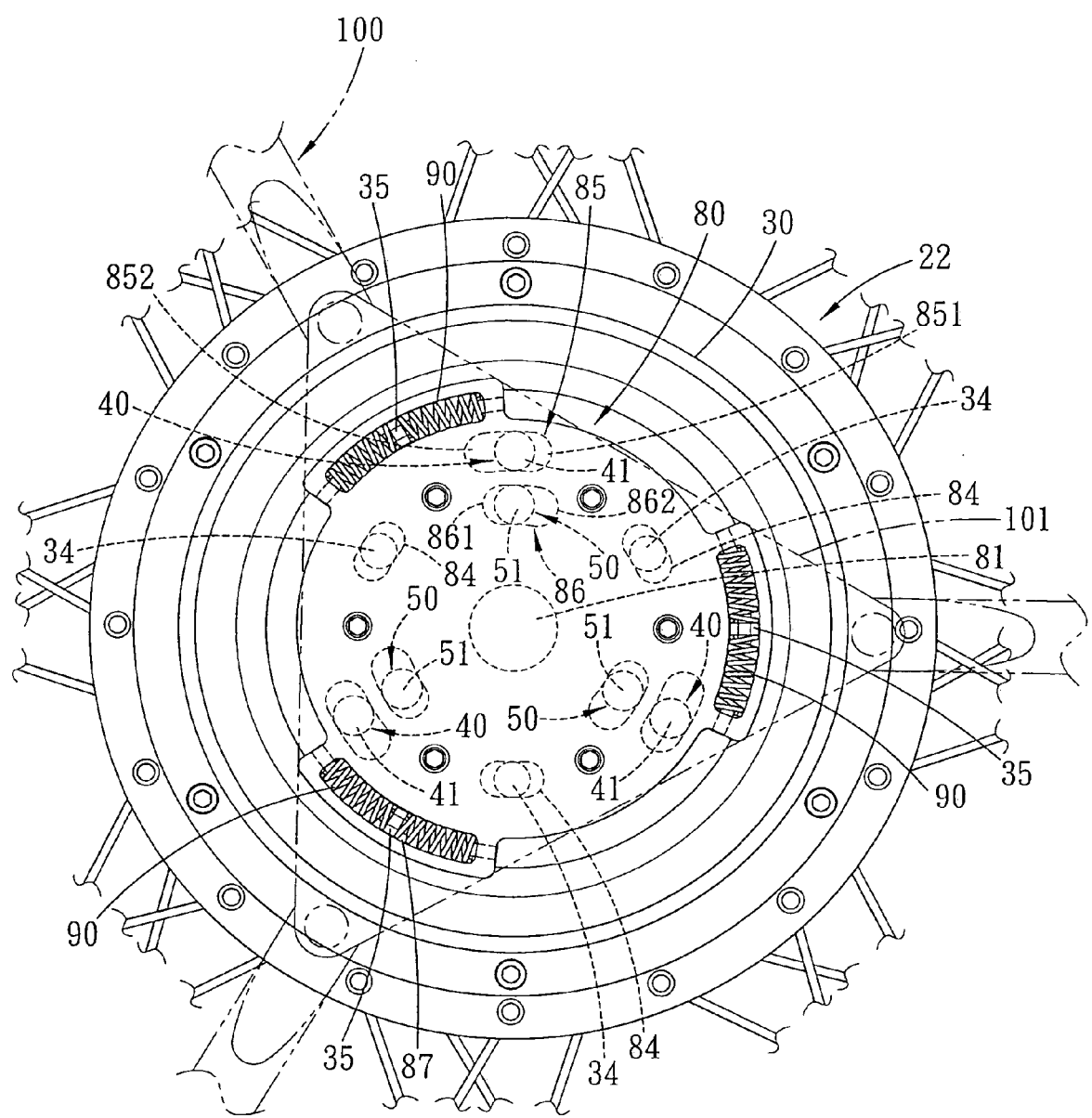
FIG. 6 is a cross sectional view of showing the auxiliary power unit starting apparatus before it is started.

Referring to FIGS. 1-6 and 9, an auxiliary power unit starting apparatus for a wheelchair in accordance with a first preferred embodiment of the present invention is shown and comprise a motor and a starting apparatus disposed at either side of a wheelchair.

The wheelchair 20 is provided at either side thereof with a wheel 21, and at the center of the wheel 21 is a wheel hub 22 that has an inner space for accommodation of a motor 23. The motor 23 can be powered by battery (not shown) and can be an external rotor motor whose rotor 231 is fixed to wheel hub 22, the stator 232 of the motor 23 is fixed to the frame 201 of the wheelchair 20, so that the motor 23 can drive the wheel 21 to rotate.

The starting apparatus is disposed at a side of the hub 22 for starting the motor 23 and comprises a housing 30, a plurality of first triggers 40, a plurality of second triggers 50, a first triggering disc 60, a second triggering disc 70, a driving disc 80, a plurality of return springs 90, a hand wheel 100, a first switch 200 and a second switch 300.

The housing 30 is fixed at a side of the hub 22 for covering the inner space and is defined with a central axial hole 31, and at radial different positions of the housing 30 are annularly formed a plurality of first stepped holes 32 and second stepped holes 33. On the external surface of the housing 30 are arranged a plurality of positioning protrusions 34 and protruding blocks 35.

Each of the first triggers 40 includes a thick portion 41 and a thin portion 42, at a top surface of the thin portion 42 is formed a threaded hole 43. A spring 44 is axially mounted on the thin portion 42, and then the thin portion 42 is set in the first stepped holes 32 of the housing 30. An end of the spring 44 abuts against the inner flange of the respective first stepped holes 32, such that the first triggers 40 are elastically installed in the first stepped holes 32.

Each of the second triggers 50 includes a thick portion 51 and a thin portion 52, at a top surface of the thin portion 52 is formed a threaded hole 53. A spring 54 is axially mounted on the thin portion 52, and then the thin portion 52 is set in the second stepped holes 33 of the housing 30. An end of the spring 54 abuts against the inner flange of the respective second stepped holes 33, such that the second triggers 50 are elastically installed in the second stepped holes 33.

The first triggering disc 60 is installed on inner surface of the housing 30 in such a manner that the threaded hole 43 on the thin portion 42 of the first triggers 40 is fixed in the surface of the first triggering disc 60 by means of screws 61.

The second triggering disc 70 is installed on inner surface of the housing 30 in such a manner that the threaded hole 53 on the thin portion 52 of the second triggers 50 is fixed in the surface of the second triggering disc 70 by means of screws 71.

The driving disc 80 is disposed at the outer surface of the housing 30 in such a manner that an axial tube 81 at a side of the driving disc 80 is inserted in the axial hole 31 of the housing 30, and then a limiter 82 is mounted at the end of the axial tube 81 for preventing disengagement of the driving disc 80 out of the housing 30. The limiter 82 can be C-shaped. A bearing 83 is disposed between the axial tube 81 and the axial hole 31, and a limiter 82 is used to fix the bearing 83. The driving disc 80 is provided with a plurality of limiting holes 84 for mating with the protrusions 34 of the housing 30, so that the driving disc 80 is allowed to rotate relative to the housing 30 within the limit of the limiting holes 84. In the abutting surface of the driving disc 80 with respect to the housing 30 are arranged a plurality of first chutes 85 and second chutes 86 each of which is slanted from a shallow end 851, 861 towards a deep end 852, 862 gradually. However, the slanting direction of the first stepped chutes 85 is opposite to that of the second stepped chutes 86. Furthermore, in the outer peripheral edge of the driving disc 80 are defined a plurality of slots 87.

The return springs 90 are biased between the housing 30 and the driving disc 80 and located in the slots 87 of the driving disc 80 in such a manner that the end of the return springs 90 abuts against the protruding blocks 35 of the housing 30. The return spring provide make the thick portion 41 of the first triggers 40 keep abutting against the deep end 852 of the first chutes 85, and the thick portion 51 of the second triggers 50 keep abutting against the deep end 862 of the second chutes 86.

The hand wheel 100 is formed at a center thereof with a connecting portion 101 through which the hand wheel 100 is fixed to the driving disc 80, and the hand wheel 100 moves synchronously with the driving disc 80.

The first switch 200 is fixed to the stator 232 for starting and stopping the motor 23 and is to be triggered by the first triggering disc 60. When the first triggering disc 60 triggers the first switch 200, the motor 23 will be started or stopped.

The second switch 300 is fixed to the stator 232 for starting and stopping the motor 23 and is to be triggered by the second triggering disc 70. When the second triggering disc 70 triggers the second switch 300, the motor 23 will be started or stopped.

Figure 7:
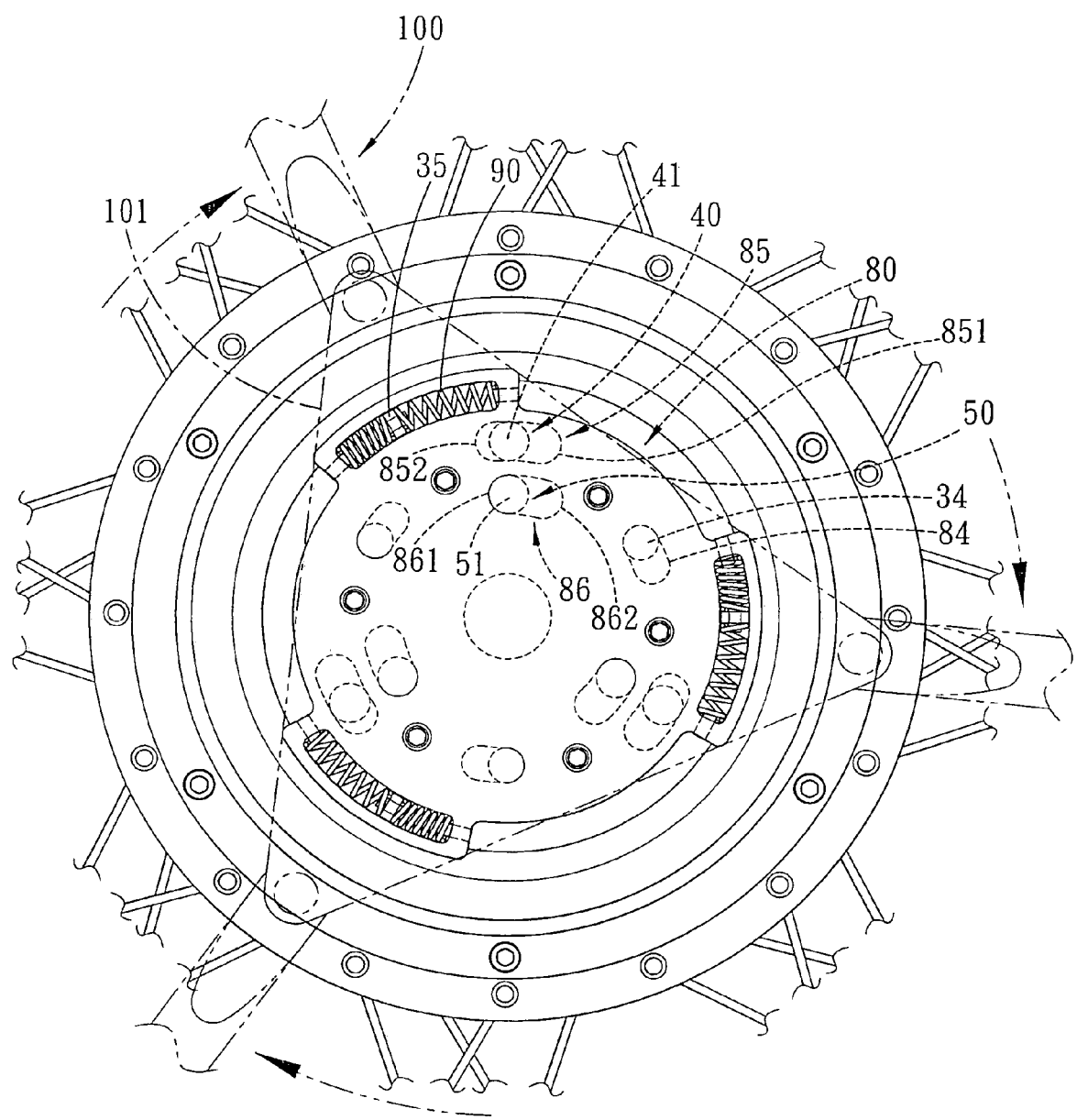
FIG. 7 is a cross sectional view of showing the auxiliary power unit starting apparatus of FIG. 6 wherein the wheels are moving forward.
Figure 10:
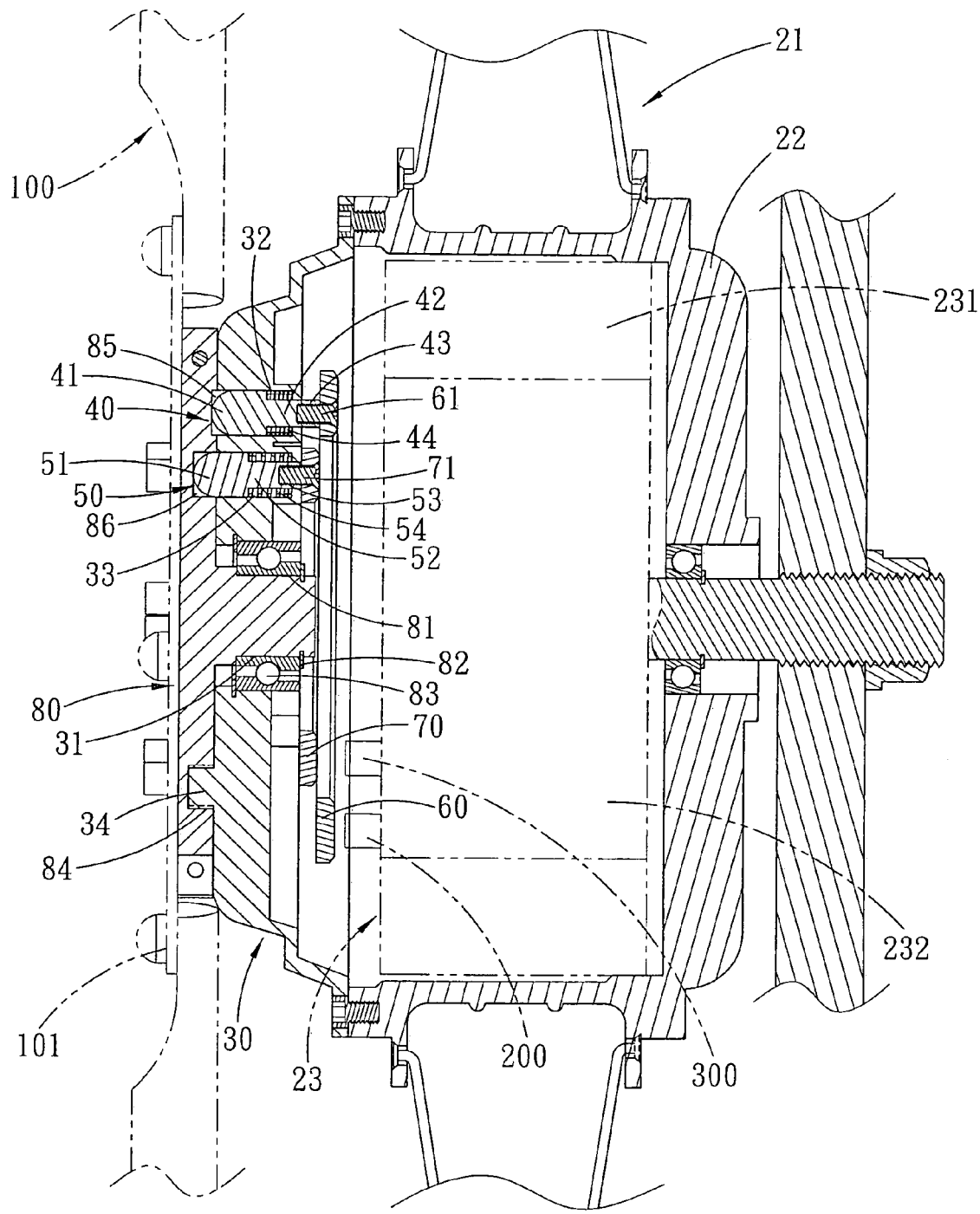
FIG. 10 is an amplified illustrative view of showing the auxiliary power unit starting apparatus of FIG. 9 wherein the wheels are moving forward.

When the user rotates the hand wheel 100 forward (clockwise) or backward (counterclockwise), the rotation of the wheel 21 can make the motor 23 output auxiliary power, and the operation of this embodiment is described below:

When the user rotates the hand wheel 100 forward (clockwise), the connecting portion 101 of the hand wheel 100 is fixed to the driving disc 80, and the driving disc 80 will rotate with the hand wheel 100. The rotating travel of the driving disc 80 is limited by the limiting holes 84 and the positioning protrusions 34. When the positioning protrusions 34 is moving towards the end of the limiting hole 84, the thick portion 41 of the first triggers 40 will move from the deep end 852 to the shallow end 851 of the first chutes 85. The first trigger 40 will move in a direction of the thin portion 42 when it is located in the shallow end 851. Meanwhile, the first triggering disc 60 will be pushed outward by the first triggers 40 (as shown in FIGS. 7 and 10) due to the first triggering disc 60 is fixed with the thin portion 42 of the respective first triggers 40. The outward displacement of the first triggering disc 60 will trigger the first switch 200, thus making the motor 23 output auxiliary rotating power. At this moment, the second triggers 50 are located in the deep end 862 of the respective second chutes 86, therefore, the second trigger disc 70 will not move outward, and accordingly the second switch 300 will not be triggered.

Figure 8:
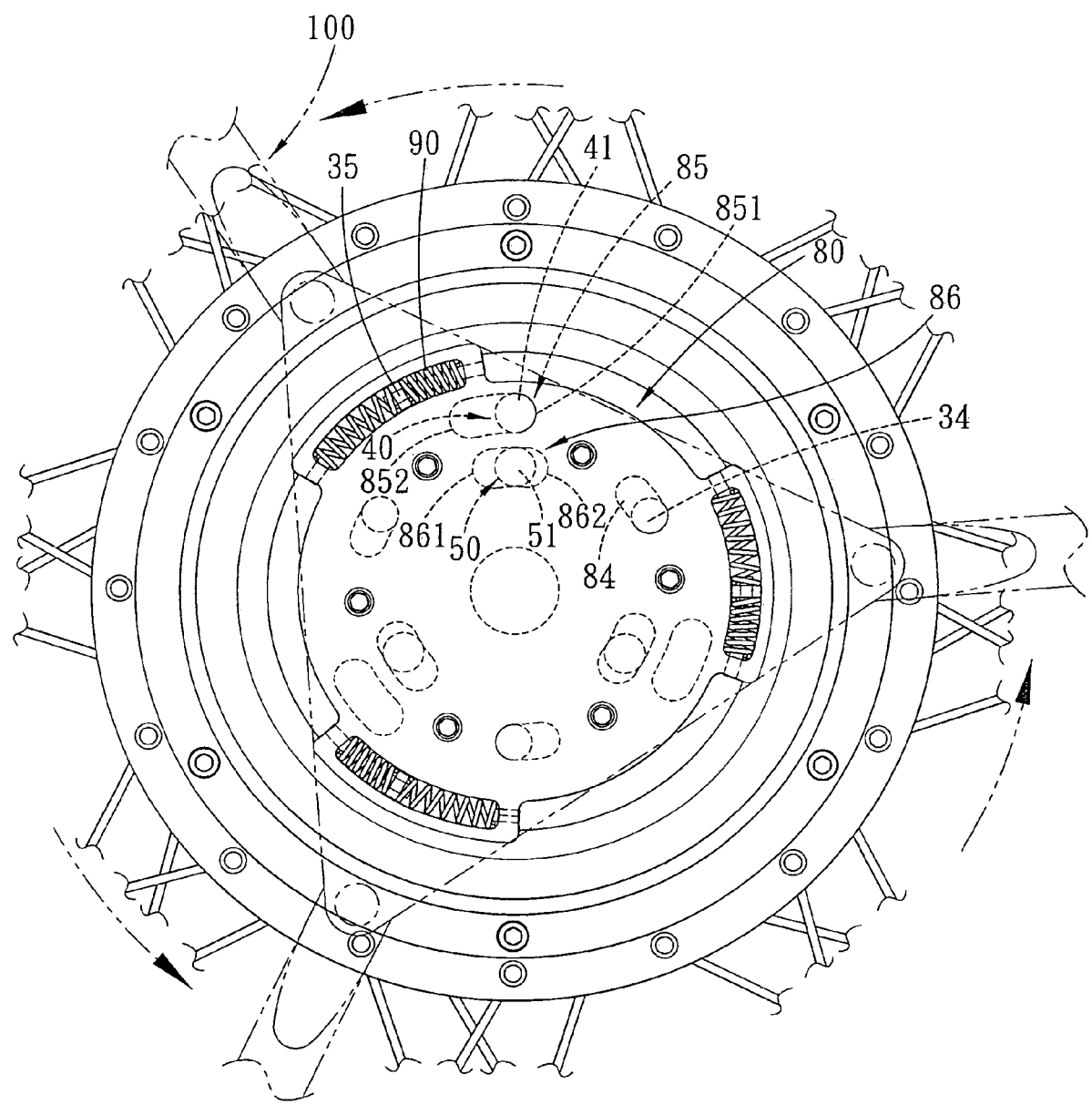
FIG. 8 is a cross sectional view of showing the auxiliary power unit starting apparatus of FIG. 6 wherein the wheels are moving backward.
Figure 9:
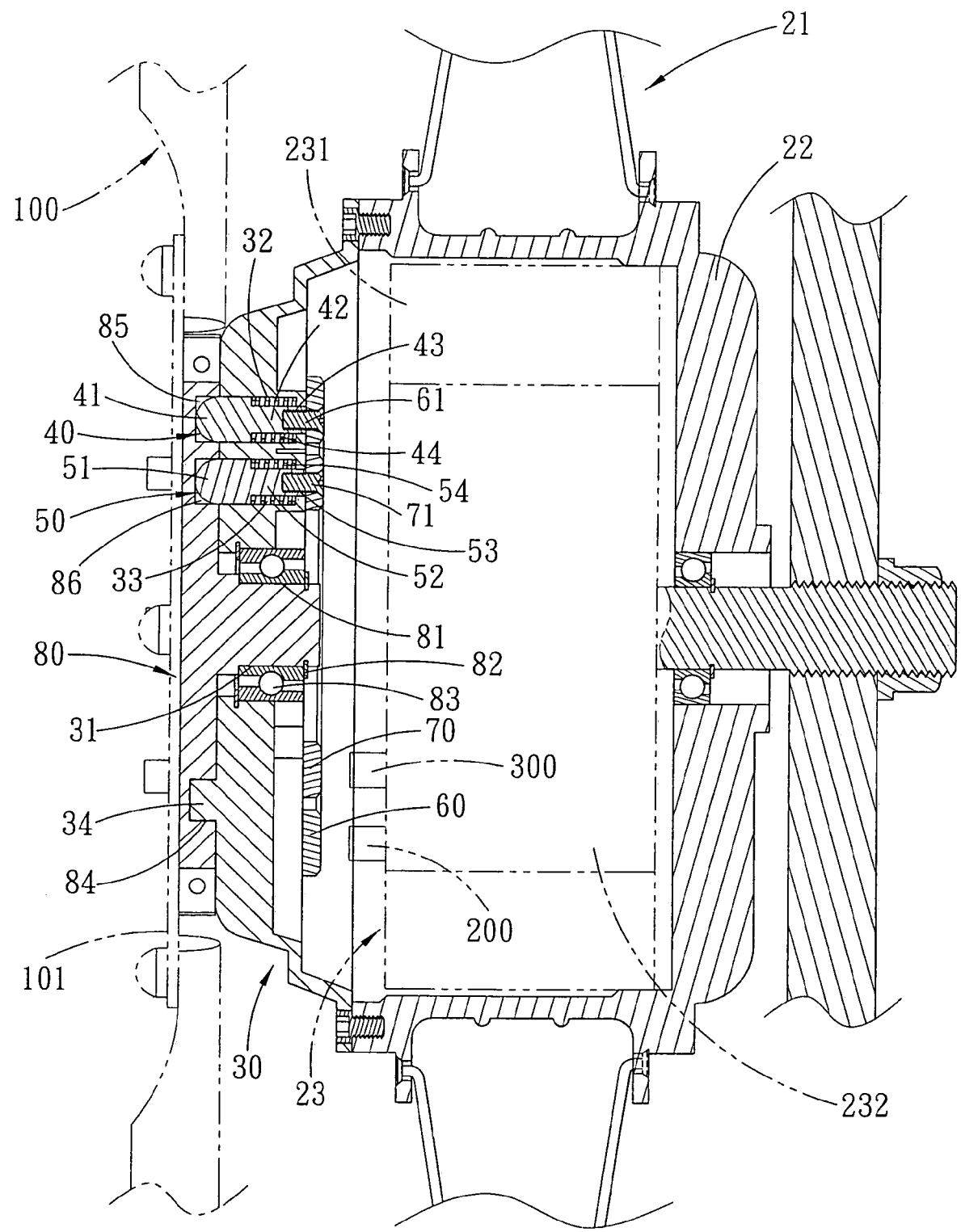
FIG. 9 is an amplified illustrative view of showing the auxiliary power unit starting apparatus before it is started.
Figure 11:
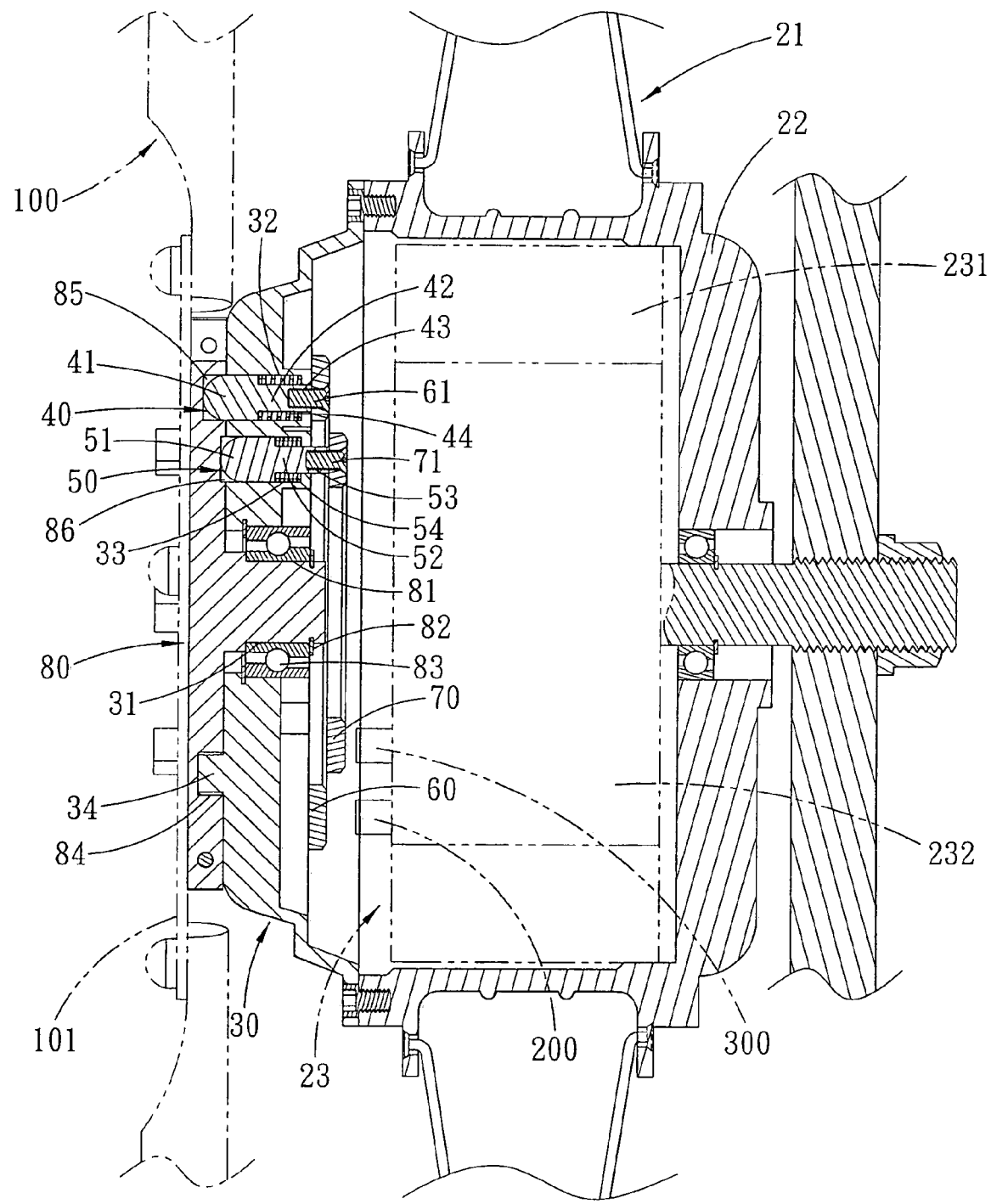
FIG. 11 is an enlarged illustrative view of showing the auxiliary power unit starting apparatus of FIG. 9 wherein the wheels are moving backward.
Figure 12:
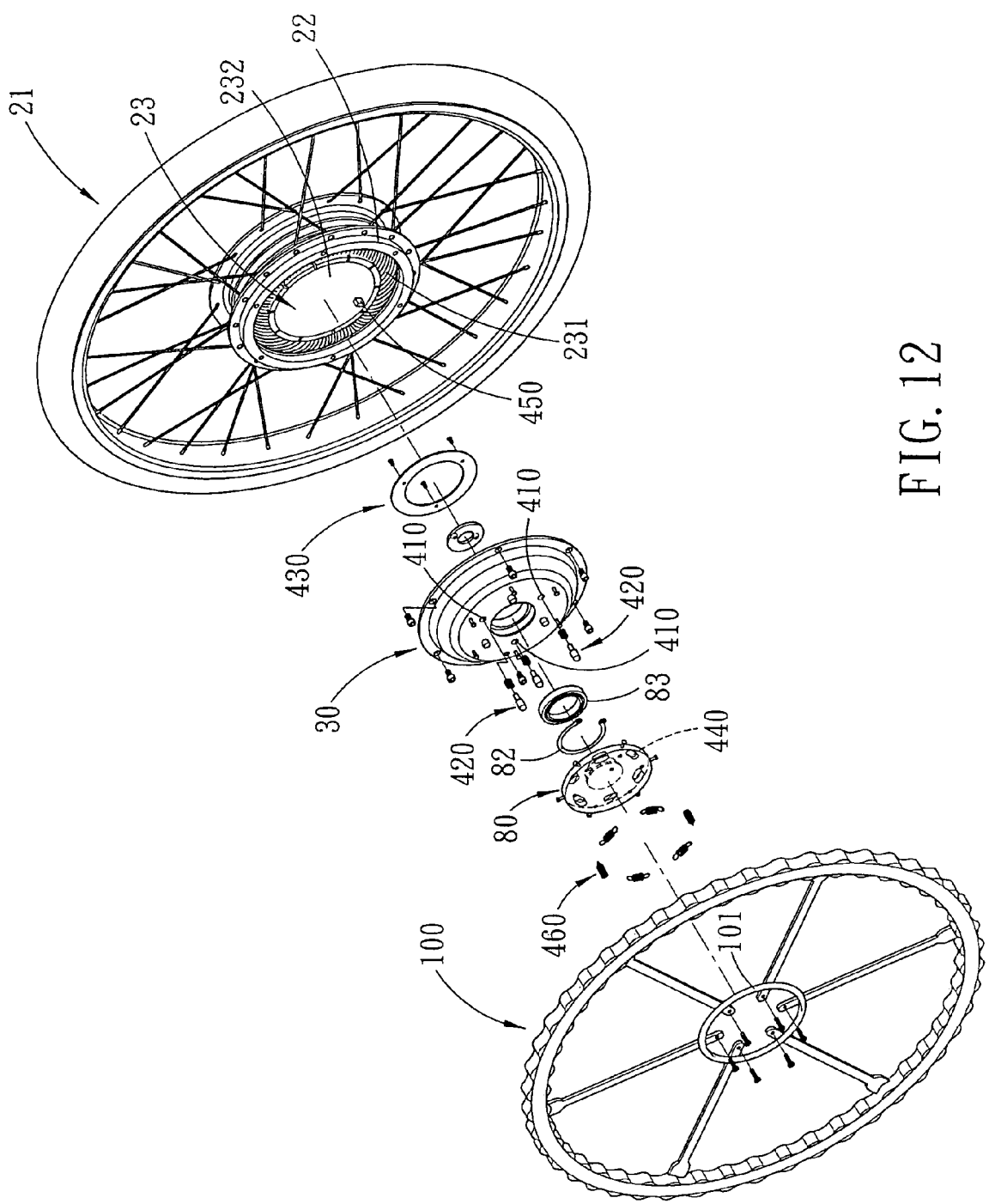
FIG. 12 is an exploded view of showing the principle components in accordance with a second preferred embodiment of the present invention.
Figure 13:
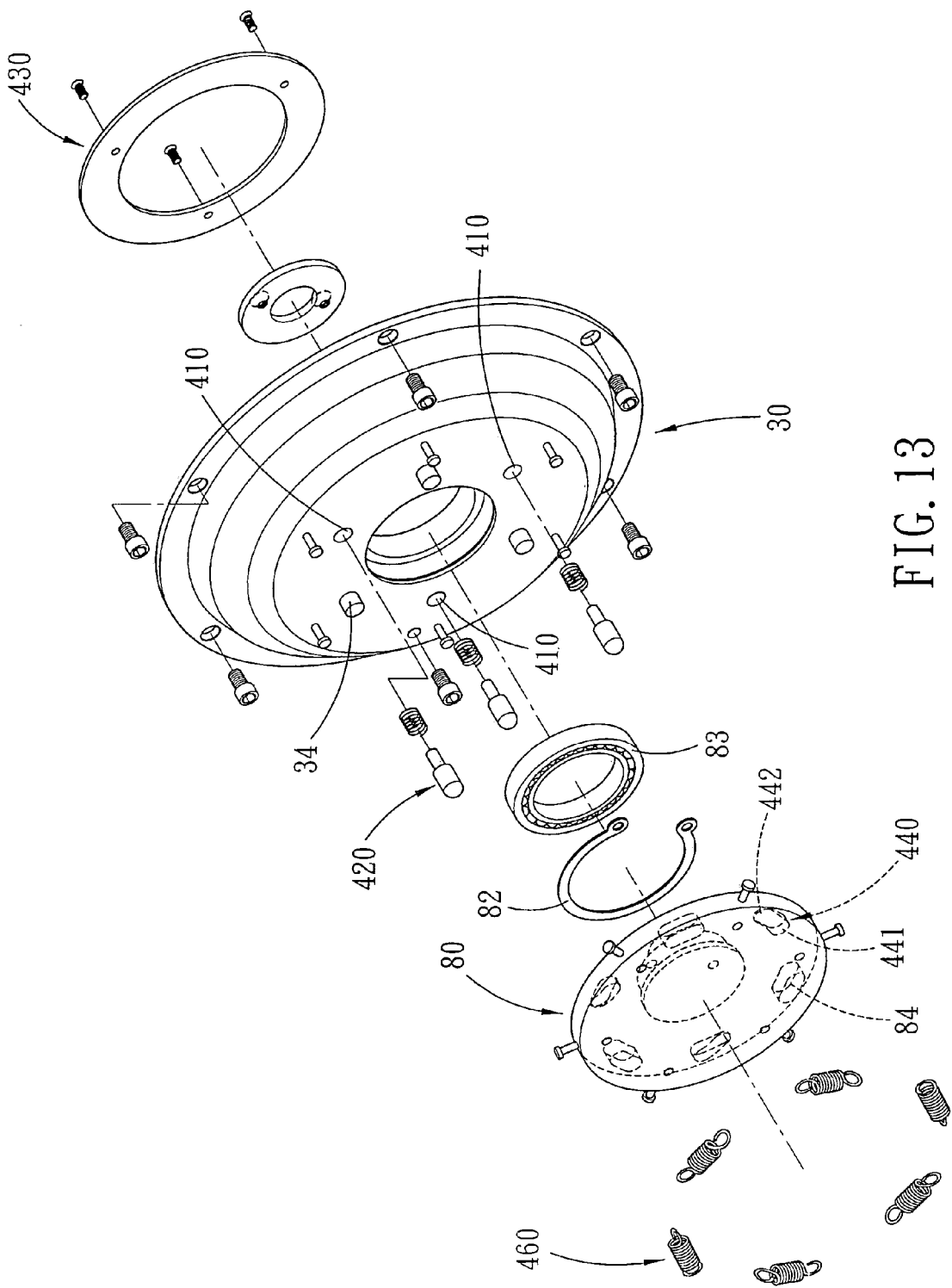
FIG. 13 is an enlarged view of FIG. 12.
Figure 14:
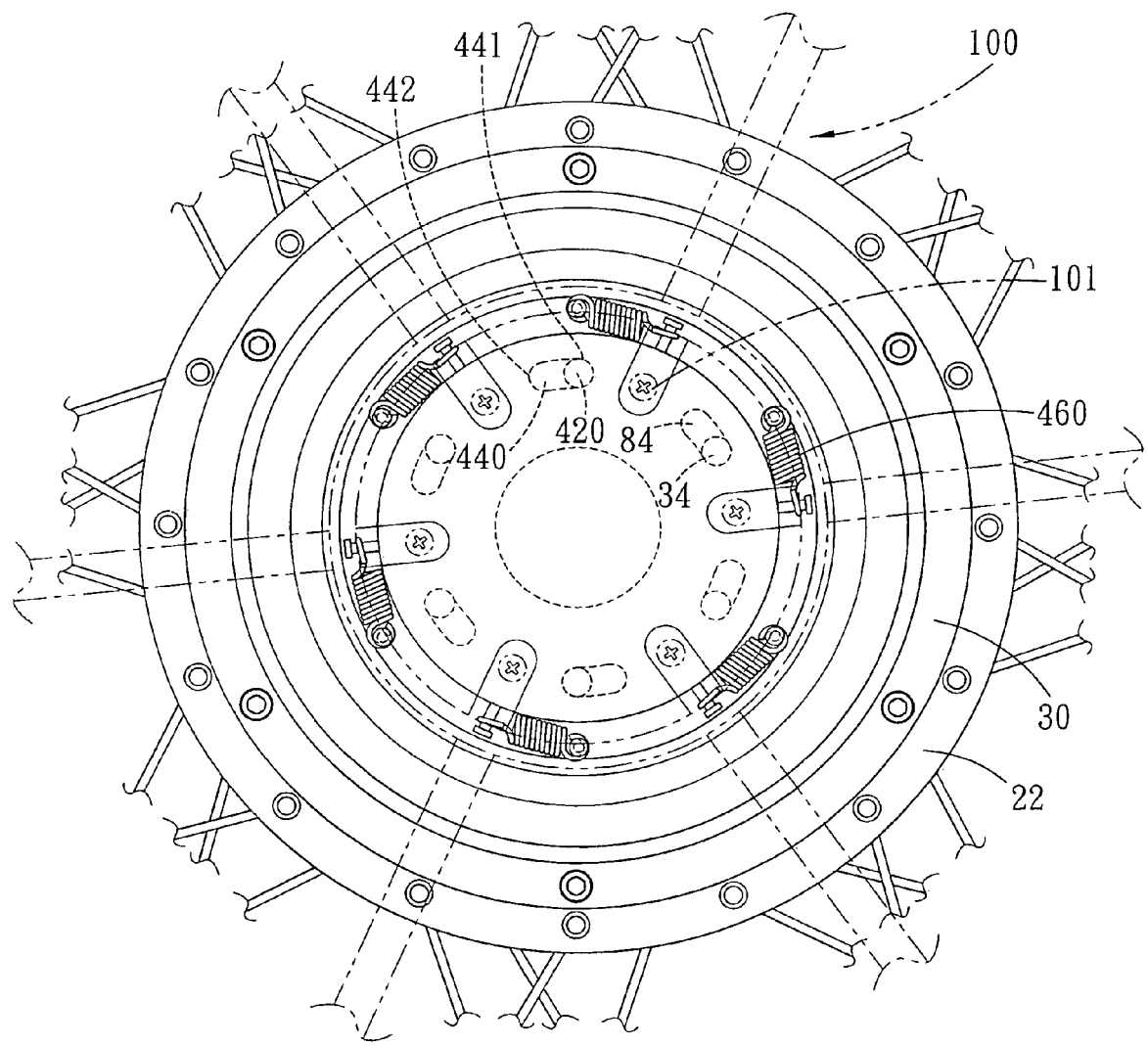
FIG. 14 is a cross sectional view in accordance with the second embodiment of the present invention of showing the auxiliary power unit starting apparatus before it is started.

Furthermore, when the user rotates the hand wheel 100 backward (counterclockwise), the rotating travel of the driving disc 80 is limited by the limiting holes 84 and the positioning protrusions 34. When the positioning protrusions 34 move towards the end of the limiting hole 84, the thick portion 51 of the second triggers 50 can move from the deep end 862 to the shallow end 861 of the second chutes 86. The second trigger 50 will move in a direction of the thin portion 52 when it is located in the shallow end 861. Meanwhile, the second triggering disc 70 will be pushed outward by the second triggers 50 (as shown in FIGS. 8 and 11) due to the second triggering disc 70 is fixed with the thin portion 52 of the respective second triggers 50. The outward displacement of the second triggering disc 70 will trigger the second switch 300, thus making the motor 23 output auxiliary rotating power. At this moment, the first triggers 60 are located in the deep end 852 of the respective first chutes 85, therefore, the first trigger disc 60 will not move outward, and accordingly the first switch 200 will not be triggered.

It will be noted that the motor will be started to output auxiliary drive power at the time the user rotates the hand wheel. In other words, the auxiliary drive power of the motor 23 is produced at the same time that the user rotates the hand wheel, so that the user not only can exercise his/her arms when rotating the wheelchair, but also will not feel too hard, especially when rotating up a slope.

Figure 15:
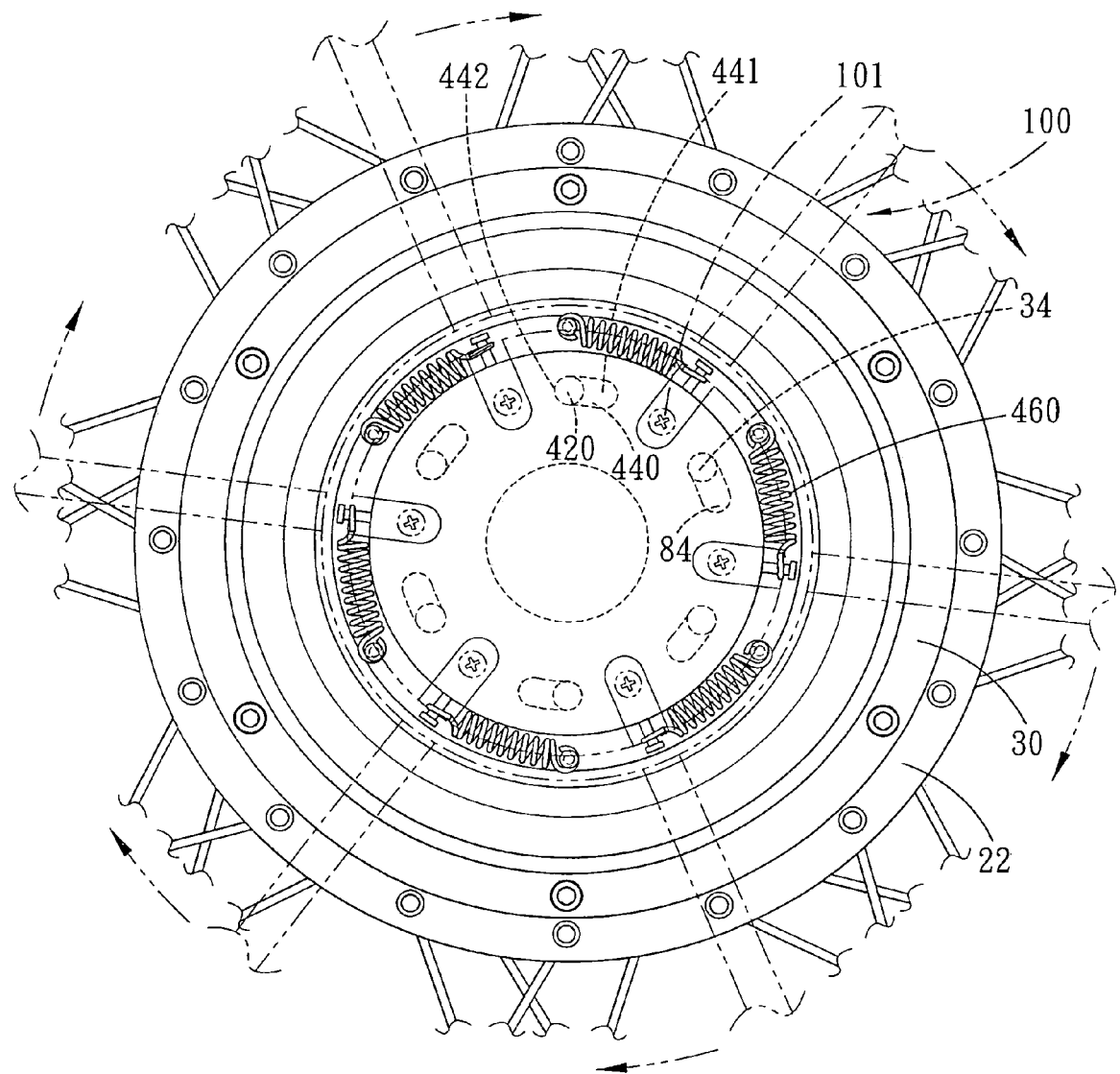
FIG. 15 is a cross sectional view of showing the auxiliary power unit starting apparatus of FIG. 14 wherein the wheels are moving forward.
Figure 16:
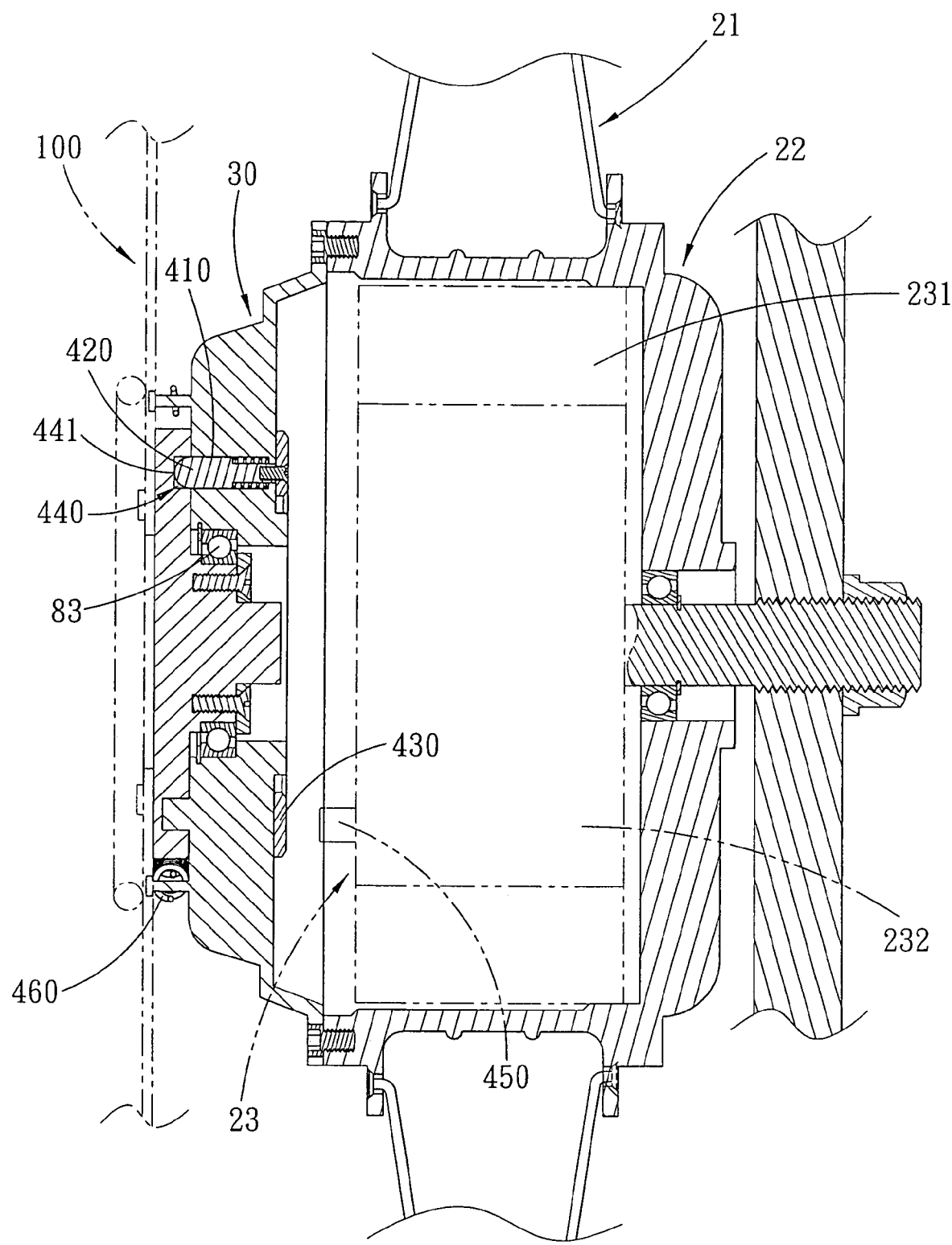
FIG. 16 is an enlarged illustrative view in accordance with the second embodiment of the present invention of showing the auxiliary power unit starting apparatus before it is started.
Figure 17:
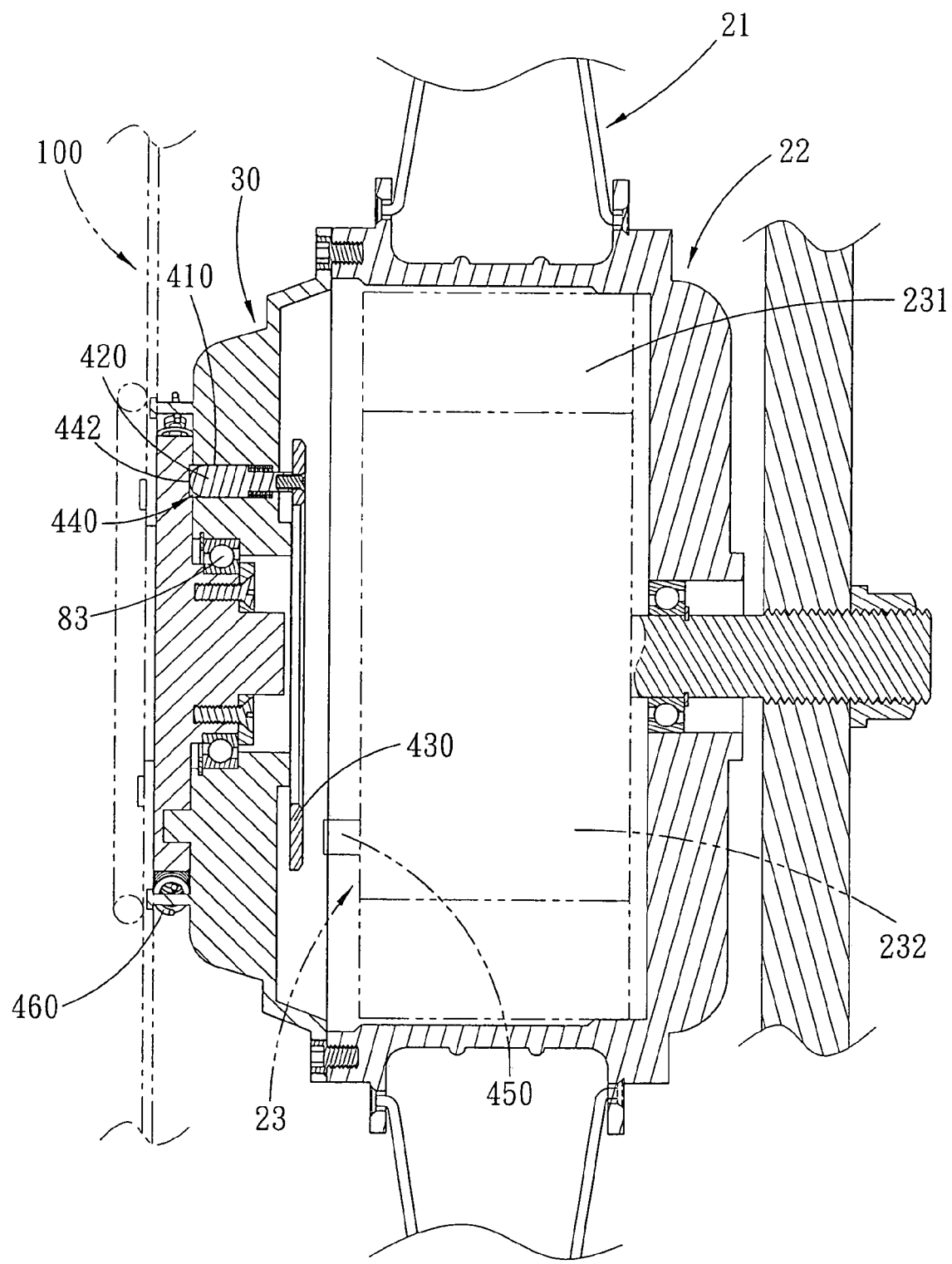
FIG. 17 is an enlarged illustrative view of showing the auxiliary power unit starting apparatus of FIG. 16 wherein the wheels are moving forward.

Referring to FIGS. 12, 13, 14 and 16, an auxiliary power unit starting apparatus for a wheelchair in accordance with a second preferred embodiment of the present invention is similar to the first embodiment, except that the auxiliary power unit of the second embodiment can be started only when the wheelchair moves forward. In other words, the device of this embodiment is structurally simplified and only comprises a plurality of stepped holes 410, a plurality of triggers 420, a triggering disc 430, a plurality of chutes 440 and a switch 450. When the user rotates the wheel forward, the triggers 420 can move from the deep end 441 to the shallow end 442 of the chutes 440 (as shown in FIGS. 15 and 17), making the triggering disc 430 move outward to trigger the switch 450, and thus the motor 23 will produce an auxiliary drive power. It is to be noted that two ends of the return springs 460 are hooked to the housing 30 and the driving disc 80, respectively.

On the other hand, the switch is preferably a proximity switch.

While we have shown and described various embodiments in accordance with the present invention, it should be clear to those skilled in the art that further embodiments may be made without departing from the scope of the present invention.

What is claimed is:

1. An auxiliary power unit starting apparatus for a wheelchair comprising a motor and a starting apparatus disposed at either side of a wheelchair;

wherein the wheelchair provided at either side thereof with a wheel, and at a center of the wheel is a wheel hub having an inner space for accommodation of a motor, a rotor of the motor is fixed to wheel hub, and the stator of the motor is fixed to a frame of the wheelchair;

the starting apparatus disposed at a side of the hub for starting the motor and comprising:

a housing is fixed at a side of the wheel hub as a cover for covering the inner space of the wheel hub and is defined with a central axial hole, and at different radial positions of the housing are annularly formed a plurality of first stepped holes and second stepped holes, on an outer surface of the housing are arranged a plurality of positioning protrusions;

a plurality of first triggers each includes a thick portion and a thin portion, a spring is axially mounted on the thin portion, and then the thin portion is set in the first stepped holes of the housing, such that the first triggers are elastically installed in the first stepped holes;

a plurality of second triggers each includes a thick portion and a thin portion, a spring is axially mounted on the thin portion of the second triggers, and then the thin portion is set in the second stepped holes of the housing, such that the second triggers are elastically installed in the second stepped holes;

a first triggering disc is installed on an inner surface of the housing, and the thin portion of the respective first triggers is fixed in surface of the first triggering disc;

a second triggering disc is installed on an inner surface of the housing, and the thin portion of the respective second triggers is fixed in surface of the second triggering disc;

a driving disc is disposed at the outer surface of the housing in such a manner that an axial tube at a side of the driving disc is inserted in the axial hole of the housing, and then a limiter is disposed at an end of the axial tube for preventing disengagement of the driving disc out of the housing, the driving disc is provided with a plurality of limiting holes for mating with the positioning protrusions of the housing, so that the driving disc is allowed to rotate relative to the housing within limit of the limiting holes, in an abutting surface of the driving disc with respect to the housing are arranged a plurality of first chutes and second chutes each of which is slanted from a shallow end towards a deep end gradually, a slanting direction of the respective first stepped chutes is opposite to that of the respective second stepped chutes;

a plurality of return springs are biased between the housing and the driving disc, the return springs provide an elastic force for enabling the thick portion of the first triggers to keep abutting against the deep end of the first chutes, and for enabling the thick portion of the second triggers to keep abutting against the deep end of the second chutes;

a hand wheel is fixed to the driving disc through a connecting portion;

a first switch is fixed to the stator for starting and stopping the motor and is to be triggered by the first triggering disc, when the first triggering disc triggers the first switch, the motor will be started or stopped; and a second switch is fixed to the stator for starting and stopping the motor and is to be triggered by the second triggering disc, when the second triggering disc triggers the second switch, the motor will be started or stopped.

2. The auxiliary power unit starting apparatus for a wheelchair as claimed in claim 1, wherein a bearing is disposed between the axial tube of the driving disc and the axial hole of the housing.

3. The auxiliary power unit starting apparatus for a wheelchair as claimed in claim 1, wherein a plurality of slots are defined in an outer peripheral edge of the driving disc, on the outer surface of the housing are arranged a plurality of protruding blocks, the respective return springs are biased between the housing and the driving disc and are located in the slots in such a manner that an end of the return springs abuts against the protruding blocks.

4. The auxiliary power unit starting apparatus for a wheelchair as claimed in claim 1, wherein the switch is a proximity switch such that the motor will be started or stopped when the triggering discs move close to the proximity switch.

5. An auxiliary power unit starting apparatus for a wheelchair comprising a motor and a starting device disposed at either side of a wheelchair;

wherein the wheelchair provided at either side thereof with a wheel, and at a center of the wheel is a wheel hub having an inner space for accommodation of a motor, a rotor of the motor is fixed to wheel hub, and the stator of the motor is fixed to a frame of the wheelchair;

the starting apparatus disposed at a side of the hub for starting the motor and comprising:

a housing is fixed at a side of the wheel hub as a cover for covering the inner space of the wheel hub and is defined with a central axial hole, and at radial positions of the housing are annularly formed a plurality of stepped holes, on an outer surface of the housing are arranged a plurality of positioning protrusions;

a plurality of triggers each includes a thick portion and a thin portion, a spring is axially mounted on the thin portion of the triggers, and then the thin portion is set in the stepped holes of the housing, such that the triggers are elastically installed in the stepped holes;

a triggering disc is installed on an inner surface of the housing, and the thin portion of the respective triggers is fixed in surface of the triggering disc;

a driving disc is disposed at the outer surface of the housing in such a manner that an axial tube at a side of the driving disc is inserted in the axial hole of the housing, and then a limiter is disposed at an end of the axial tube for preventing disengagement of the driving disc out of the housing, the driving disc is provided with a plurality of limiting holes for mating with the positioning protrusions of the housing, so that the driving disc is allowed to rotate relative to the housing within limit of the limiting holes, in an abutting surface of the driving disc with respect to the housing are arranged a plurality of chutes each of which is slanted from a shallow end towards a deep end gradually;

a plurality of return springs are biased between the housing and the driving disc, the return springs provide an elastic force for enabling the thick portion of the triggers to keep abutting against the deep end of the chutes;

a hand wheel is fixed to the driving disc through a connecting portion;

a switch is fixed to the stator for starting and stopping the motor and is to be triggered by the triggering disc, when the triggering disc triggers the switch, the motor will be started or stopped.

* * * * *